United States Patent Office 3,699,077
Patented Oct. 17, 1972

3,699,077
COMBINATIONS OF PHOSPHONIUM BROMIDES AND BROMINATED AROMATIC COMPOUNDS AS FLAME-RETARDANT COMPOSITIONS FOR OLEFIN POLYMERS
Robert William Murray, Lebanon, N.J., assignor to American Cyanamid Company, Stamford, Conn.
No Drawing. Filed Oct. 29, 1970, Ser. No. 85,305
Int. Cl. C09k 3/28
U.S. Cl. 260—45.9 R   3 Claims

ABSTRACT OF THE DISCLOSURE

Flame-retardant compositions comprising (A) a compound having the formula

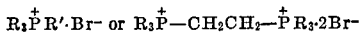

wherein R is phenyl or 2-cyanoethyl and R' is lower alkyl or 2-cyanoethyl and (B) a brominated aromatic compound containing at least 60%, by weight, of bromine, and olefin polymers containing said compositions, are disclosed.

BACKGROUND OF THE INVENTION

The production of resin compositions which are flame-retardant is of considerable commercial importance in that such articles as castings, moldings, laminated articles, etc. are required, or at least desired, to be resistant to fire and flame and to possess the ability to endure heat without deterioration. Typical illustrations of applications of such compositions include castings for live electrical contacts which should not be ignited by flame or sparks, structural members such as pipes, wall coverings, wall paneling, windows, etc. and such items as ash trays, waste baskets, fibers and the like.

The use of certain additives for the purpose of reducing the flammability of various thermoplastic polymers is well known to those skilled in the art. Among the additives currently employed for such a use are various specific types of phosphonium bromide compounds. These phosphorus compounds are generally used either alone (U.S. 3,530,164 and 3,322,861) or in combination with other materials such as chlorinated aliphatic hydrocarbons (U.S. 3,422,047 and 3,422,048) or 2,3-dicarboxy-5,8-endomethylene - 5,6,7,8,9,9 - hexachloro - 1,2,3,4,4a,5,8,8a-octahydronaphthalene anhydride and its esters (U.S. 3,530,089 and 3,530,088).

SUMMARY

I have now found that excellent flame-retarding properties can be imparted to olefin polymers by incorporating into the polymer a synergistic combination or mixture of (A) a phosphonium bromide having the formula (I)   

where R is phenyl or 2-cyanoethyl and R' is lower alkyl or 2-cyanoethyl, or the formula (II)   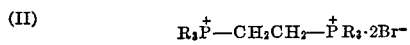

wherein R is as defined above, and (B) a brominated aromatic compound containing at least 60%, by weight, bromine.

The novel synergistic combination of phosphonium bromide and brominated aromatic compound provides improved flame-retardance over additives of the prior art and, additionally, generally provides this superior result at lower concentrations than previously believed necessary for known additives. The results shown by the use of the above-disclosed novel flame-retardant combinations are surprising and unexpected in that the combinations provide a greater degree of flame-retardancy than one would expect from the results shown by the use of the components individually, i.e. they are synergistic.

DESCRIPTION OF THE INVENTION INCLUDING PREFERRED EMBODIMENTS

As mentioned above, the first critical component of my novel flame-retardant compositions is a compound represented by either Formula I or Formula II, above. These compounds are generally well known in the art, as are methods for their production, as represented by U.S. Pat. No. 3,005,013 and those set forth hereinabove, which patents are all incorporated herein by reference.

The second critical component of my novel flame-retardant compositions is a brominated aromatic compound having a content of combined bromine of at least about 60%, by weight, based on the weight of the compound per se. Usually, compounds falling within this bromine content possess at least two bromine atoms per each ring thereof. Examples of suitable brominated compounds include brominated benzenes, e.g. hexabromobenzene, pentabromobenzene, 2,4-dibromobenzene etc., brominated toluenes, e.g. pentabromotoluene, tribromotoluene etc., brominated xylenes e.g. tetrabromoxylene, tribromoxylene etc., brominated biphenyls e.g. decabromobiphenyl, octabromobiphenyl, hexabromobiphenyl, tetrabromobiphenyl etc., non-hydrocarbon aromatics, e.g. brominated diphenyl ethers such as decabromodiphenylether, octabromodiphenylether, hexabromodiphenylether, tetrabromodiphenylether etc. These compounds are all well known in the art, as are methods for their preparation.

The combination of phosphonium bromide and brominated aromatic compound is useful as flame-retardant when incorporated into olefin polymers in a flame-retarding amount, i.e. at least about 10%, by weight, preferably from about 10% to about 25%, by weight, based on the weight of the olefin polymer. The ratio of phosphonium bromide to brominated aromatic compound should range from about 2:1 to about 1:2, respectively.

The olefin polymers rendered flame-retardant by the incorporation therein of my novel combination should possess from 2–4 carbon atoms, inclusive, and include the homopolymers of ethylene, propylene, butylene, isobutylene etc. and copolymers of these olefins with one another, e.g. copolymers of ethylene and propylene containing 10–90% of e.g. ethylene, by weight.

The novel flame-retardant combination claimed herein may be added to the various polymers, as such, or as individual components, by any known method. That is to say, the flame-retardant components may be added to the polymer, as such, or in combination by (1) milling the polymer and the components on, for example, a two-roll mill, in a Banbury mixer, etc., by (2) molding the components and the polymer simultaneously, by (3) extruding the polymer and components or by (4) merely blending all the materials together in powder or liquid form and thereafter forming the desired ultimate product. Additionally, the flame-retardant components or combination may be added during the production of the polymer, i.e. during the monomer polymerization, provided, however, that the catalyst, etc., other conditions and other ingredients of the polymerization system are inert thereto.

It is also within the scope of the instant invention to incorporate such ingredients as plasticizers, dyes, pigments, heat and light stabilizers, antioxidants, antistatic agents, photochromic materials and the like into the flame-retarded polymer compositions claimed herein.

The following examples are set forth for purposes of illustration only and are not to be construed as limitations on the present invention except as set forth in the appended claims. All parts and percentages are by weight unless otherwise specified. In the examples, the additives, in the concentrations indicated, were dry blended with the olefin polymer, extruded at 420° F. and chopped into pellets. The pellets containing the flame-retardant compositions were then injection molded at 400–450° F. into bars 5" x 0.5" x 0.25". The flammability of these bars was measured according to ASTM–D–635, as described in the above-mentioned patents. The results are set forth in Table I, below.

I claim:
1. A flame-retarded composition comprising polypropylene having incorporated therein a flame-retarding amount of a composition comprising (A) tetrakis(2-cyanoethyl)phosphonium bromide or ethylenebis[tris(2-cyanoethyl)]phosphonium bromide and (B) hexabromobenzene, the ratio of (A):(B) ranging from about 2:1 to about 1:2, respectively.
2. A composition according to claim 1 wherein said (A) is tetrakis(2-cyanoethyl)phosphonium bromide.
3. A composition according to claim 1 wherein said (A) is ethylenebisphosphonium bromide.

TABLE I

| Ex. | Formula No. | R | $R_1$ | Percent | Brominated aromatic compound | Olefin polymer | Flammability rating ASTM D-635 |
|---|---|---|---|---|---|---|---|
| 1 | | | | | Hexabromobenzene, 10% | Polypropylene | Free-burning. |
| 2 | II | 2-cyanoethyl | | 10 | | do | Do. |
| 3 | II | do | | 5 | Hexabromobenzene, 5% | do | Self-extinguishing. |
| 4 | | | | | Decabromodiphenylether, 10% | do | Free-burning. |
| 5 | II | 2-cyanoethyl | | 5 | Decabromodiphenylether, 5% | do | Self-extinguishing. |
| 6 | | | | | Hexabromobiphenyl, 10% | do | Free-burning. |
| 7 | II | 2-cyanoethyl | | 5 | Hexabromobiphenyl, 5% | do | Self-extinguishing. |
| 8 | | | | | Octabromobiphenyl, 10% | do | Free-burning. |
| 9 | II | 2-cyanoethyl | | 5 | Octabromobiphenyl, 5% | do | Self-extinguishing. |
| 10 | | | | | Pentabromotoluene, 10% | do | Free-burning. |
| 11 | II | 2-cyanoethyl | | 5 | Pentabromotoluene, 5% | do | Self-extinguishing. |
| 12 | I | do | 2-cyanoethyl | 10 | | do | Free-burning. |
| 13 | I | do | do | 5 | Hexabromobenzene, 5% | do | Self-extinguishing. |
| 14 | | | | | Dibromobenzene, 10% | do | Free-burning. |
| 15 | II | 2-cyanoethyl | | 5 | Dibromobenzene, 5% | do | Self-extinguishing. |
| 16 | | | | | Hexabromobenzene, 10% | Ethylene-propylene copolymer (20/80) | Free-burning. |
| 17 | II | 2-cyanoethyl | | 10 | | do | Do. |
| 18 | II | do | | 5 | Hexabromobenzene, 5% | do | Self-extinguishing. |
| 19 | | | | | | Polyethylene | Free-burning. |
| 20 | II | Phenyl | | 11 | | do | Self-extinguishing. |
| 21 | II | do | | 7 | Dibromobenzene, 3.5% | do | Self-extinguishing. |
| 22 | | | | | Dibromobenzene, 11% | do | Free-burning. |
| 23 | II | Phenyl | | 5 | Hexabromodiphenylether, 5% | do | Self-extinguishing. |
| 24 | | | | | Hexabromodiphenylether, 10% | do | Free-burning. |
| 25 | I | Phenyl | Methyl | 10 | | do | Do. |
| 26 | I | do | do | 4 | Hexabromodiphenyl, 6% | do | Self-extinguishing. |
| 27 | | | | | Hexabromodiphenyl, 10% | do | Free-burning. |
| 28 | I | Phenyl | Butyl | 12 | | do | Do. |
| 29 | I | do | do | 8 | Tetrabromobenzene, 4% | do | Self-extinguishing. |
| 30 | | | | | Tetrabromobenzene, 12% | do | Free-burning. |
| 31 | I | Phenyl | 2-cyanoethyl | 12 | | do | Do. |
| 32 | I | do | do | 4 | Tetrabromobiphenyl, 8% | do | Self-extinguishing. |
| 33 | | | | | Tetrabromobiphenyl, 12% | do | Free-burning. |
| 34 | I | 2-cyanoethyl | Methyl | 10 | | do | Do. |
| 35 | I | do | do | 6 | Tribromoxylene, 4% | do | Self-extinguishing. |
| 36 | | | | | Tribromoxylene, 10% | do | Free-burning. |
| 37 | I | 2-cyanoethyl | Butyl | 10 | | do | Do. |
| 38 | I | do | do | 5 | Tetrabromodiphenylether, 5% | do | Self-extinguishing. |
| 39 | | | | | Tetrabromodiphenylether, 10% | do | Free-burning. |
| 40 | II | Phenyl | | 10 | | Polyisobutylene | Do. |
| 41 | II | do | | 5 | Hexabromobenzene, 5% | do | Self-extinguishing. |
| 42 | | | | | Hexabromobenzene, 10% | do | Free-burning. |
| 43 | I | 2-cyanoethyl | 2-cyanoethyl | 10 | | Polybutylene | Do. |
| 44 | I | do | do | 5 | Dibromotoluene, 5% | do | Self-extinguishing. |
| 45 | | | | | Dibromotoluene, 10% | do | Free-burning. |
| 46 | I | Phenyl | Methyl | 11 | | Ethylene-butylene copolymer (80/20) | Do. |
| 47 | I | do | do | 3.5 | Octabromobiphenyl, 7% | do | Self-extinguishing. |
| | | | | | Octabromobiphenyl, 11% | do | Free-burning. |

References Cited
UNITED STATES PATENTS

| | | | |
|---|---|---|---|
| 2,028,715 | 1/1936 | Hanson | 252—8.1 |
| 3,133,038 | 5/1964 | Hahn | 260—41 |
| 3,326,832 | 6/1967 | Rauschenbach et al. | 260—28.5 |
| 3,455,873 | 7/1969 | Jenkner | 260—45.7 |
| 3,576,770 | 4/1971 | Evans et al. | 260—2.5 |
| 3,422,047 | 1/1969 | Cannelongo | 260—28.5 |
| 3,372,141 | 3/1968 | Dickerson et al. | 260—45.95 |
| 3,331,797 | 7/1967 | Kopetz et al. | 260—28.5 |
| 3,347,822 | 10/1967 | Jenkner | 260—45.75 |
| 3,422,048 | 1/1969 | Cannelongo | 260—28.5 |
| 3,420,786 | 1/1969 | Weber et al. | 260—2.5 |
| 3,535,300 | 10/1970 | Gable | 260—29.1 |
| 3,530,088 | 9/1970 | Savides | 260—45.8 |
| 3,530,089 | 9/1970 | Savides | 260—45.8 |

DONALD E. CZAJA, Primary Examiner

R. A. WHITE, Assistant Examiner

U.S. Cl. X.R.

106—15 FP; 252—8.1; 260—45.7 P, 45.7 R

UNITED STATES PATENT OFFICE
CERTIFICATE OF CORRECTION

Patent No. 3,699,077      Dated October 17, 1972

Inventor(s) Robert William Murray

It is certified that error appears in the above-identified patent and that said Letters Patent are hereby corrected as shown below:

Column 4, line 12, "ethylenebisphosphonium" should read -- ethylenebis[tris(2-cyanoethyl)]phosphonium -- .

Signed and sealed this 15th day of May 1973.

(SEAL)
Attest:

EDWARD M. FLETCHER, JR.
Attesting Officer

ROBERT GOTTSCHALK
Commissioner of Patents